US008397755B2

(12) United States Patent
Takami

(10) Patent No.: US 8,397,755 B2
(45) Date of Patent: Mar. 19, 2013

(54) COUPLER WITH STOP VALVE

(75) Inventor: Makoto Takami, Sagamihara (JP)

(73) Assignee: Daiwa Can Company, Tokyo (JP)

(*) Notice: Subject to any disclaimer, the term of this patent is extended or adjusted under 35 U.S.C. 154(b) by 351 days.

(21) Appl. No.: 12/698,505

(22) Filed: Feb. 2, 2010

(65) Prior Publication Data

US 2011/0186764 A1    Aug. 4, 2011

(51) Int. Cl.
*E03B 1/00* (2006.01)
(52) U.S. Cl. ............ 137/614.05; 137/614.04; 251/149.6
(58) Field of Classification Search ............ 137/614.03, 137/614.04, 615.05; 251/149.6
See application file for complete search history.

(56) References Cited

U.S. PATENT DOCUMENTS

| 5,482,083 | A | 1/1996 | Jenski | |
|---|---|---|---|---|
| 6,523,863 | B2 * | 2/2003 | Ishiwata | 285/316 |
| 2004/0103946 | A1 * | 6/2004 | Nanni et al. | 137/614.03 |
| 2006/0243332 | A1 * | 11/2006 | Harvey et al. | 137/614.04 |
| 2008/0041468 | A1 | 2/2008 | Yoshihiro et al. | |

FOREIGN PATENT DOCUMENTS

| EP | 1 990 857 A1 | 11/2008 |
|---|---|---|
| JP | 50-79025 U | 7/1975 |
| JP | 57-30490 U | 2/1982 |
| JP | 57-30491 U | 2/1982 |
| JP | 64-43292 U | 3/1989 |
| JP | 3-125095 | 5/1991 |
| JP | 6-58443 | 3/1994 |
| JP | 2002-54782 | 2/2002 |
| JP | 2003-117748 | 4/2003 |
| JP | 2003-172487 | 6/2003 |
| JP | 2007-57007 | 3/2007 |
| JP | 2007-87653 | 4/2007 |
| JP | 2007-194054 | 8/2007 |

OTHER PUBLICATIONS

Office Action issued May 8, 2012, in Japanese Patent Application No. 2007-310370 with English translation.

* cited by examiner

*Primary Examiner* — John K Fristoe, Jr.
*Assistant Examiner* — Reinaldo Sanchez-Medina
(74) *Attorney, Agent, or Firm* — Oblon, Spivak, McClelland, Maier & Neustadt, L.L.P.

(57) ABSTRACT

A coupler having a stop valve, in which one of the connectors comprises a cylindrical wall, and a fixed shaft arranged along an axis of the cylindrical wall. A valve seat is arranged around the fixed shaft, and the valve seat is tapered to widen a diameter thereof. A cylindrical valve element is fitted onto the fixed shaft to slide in its axial direction while being pushed by an elastic member, and an inner circumferential face of the valve element is tapered to be congruent with the taper of the valve seat. An engagement portion which is diametrically larger than the leading end portion of the valve element is formed on the outer circumferential face of the valve element at an intermediate portion. Another connector comprises a cylindrical portion. A pushing portion is formed at an end of the cylindrical portion for pushing the valve element at the engagement portion.

11 Claims, 5 Drawing Sheets

COUPLER WITH STOP VALVE

BACKGROUND OF THE INVENTION

1. Field of the Invention

The present invention relates to a coupler, in which flow channels of a supply side connector and a receiving side connector are communicated in case a valve formed in at least one of the connectors is opened by connecting the connectors. More specifically, the present invention relates to a coupler for connecting a cartridge of a methanol fuel cell with a main body of the fuel cell.

The disclosure of Japanese Patent Application No. 2007-310370 filed on Nov. 30, 2007 including specification, drawings and claims are incorporated herein by reference in its entirety.

2. Discussion of the Related Art

In the prior art, a liquid-consuming device is refilled with a consumable liquid such as fuel by connecting a cartridge containing the liquid with a container of the device, or by replacing the container of the device itself with a spare container containing the liquid.

In recent years, fuel cells have been used as a power source of portable electronic devices such as a laptop computer, a mobile phone etc. for the purpose of extending usable period of the devices without charging. The fuel cell is capable of generating electricity by supplying fuel and air thereto. That is, the fuel cell is capable of generating over a long period of time by merely supplying the fuel thereto. Thus, the fuel cell is a promising energy source for the portable electronic devices and therefore required to be downsized.

For instance, a direct methanol fuel cell (to be abbreviated as DMFC hereinafter) using methanol fuel of high energy density can be downsized comparatively easily, and the methanol fuel can be handled comparatively easily. Therefore, the DMFC is expected to be used as a power source of the electronic devices. There are two kinds of liquid fuel supplying systems of the DMFC such as an "active" system and a "passive" system are known in the art. Specifically, according to the active system, the liquid fuel is fed to the fuel cell by an external power. Meanwhile, according to the passive system, the liquid fuel is aspirated to the fuel cell in a passive manner by a capillary action or the like.

For example, according to Japanese Patent Laid-Open No. 2007-57007 and Japanese Patent Laid-Open No. 2007-194054, a satellite type (i.e., external injection type) fuel cartridge is used to supply liquid fuel to a fuel tank. Specifically, according to the teachings of Japanese Patent Laid-Opens Nos. 2007-57007 and 2007-194054, the liquid fuel is supplied and interrupted to the fuel tank using a coupler constituted of a nozzle and a socket each having a valve mechanism inside. In addition, Japanese Patent Laid-Open No. 2003-172487 discloses a connecting device having a plug and a socket to be engaged with the plug. According to the teachings of Japanese Patent Laid-Open No. 2003-172487, flow channels formed individually in the plug and the socket are communicated by inserting the plug into the socket thereby opening the valve.

According to the teachings of the Japanese Patent Laid-Opens Nos. 2007-57007 and 2007-194054, the socket and the plug are provided individually with a valve element. Specifically, the valve element is adapted to be pushed onto a valve seat by a spring situated behind in its axial direction, and the valve element comprises a protruding portion such as an operating portion protruding from a portion to be contacted with the valve seat. Therefore, in case the plug is inserted into the socket, the protruding portions of each valve element push each other and moved backwardly away from the valve seat against the elastic forces of the springs. As a result, the valve is opened. To the contrary, in case of withdrawing the plug from the socket, each of the valve elements is pushed toward the valve seat thereof by the spring as a reduction of a depth of the plug insertion, and contacted gradually with the valve seat to open the valve. At the same time, the protruding portions of the valve elements are detached from each other, and the plug is disengaged from the socket.

According to the teachings of the Japanese Patent Laid-Opens Nos. 2007-57007 and 2007-194054, the valve elements are thus adapted to push each other at the protruding portions. Therefore, in case the plug is inserted into the socket, a distance between the valve seats is rather long, and a large amount of the liquid may remain between the valve seats under the condition in which the valves of both plug and the socket are opened. For this reason, when the plug is withdrawn from the socket, the remaining liquid may leak therefrom. Thus, the liquid may be wasted and it is not easy to cope with the leaked liquid. In addition, the liquid of high responsiveness such as methanol, formic acid and so on are used as the fuel of the fuel cell. For example, methanol of more than 99.8% concentration is designated as a poisonous and deleterious substance because it is harmful to the humans.

In addition, according to the teachings of the Japanese Patent Laid-Opens Nos. 2007-57007 and 2007-194054, an order of the valve elements to be opened is governed by a relation between strengths of elastic forces of the springs pushing the valve elements of the socket and the plug. Specifically, an elastic force of the spring pushing the valve element of the liquid container side is relatively weakened to open the valve element earlier in case of inserting the plug into the socket, and to close the valve element later in case of withdrawing the plug from the socket. Therefore, in case of regulating the elastic force of one of the springs of the socket and the plug, the elastic force of other spring is also need to be adjusted in order not to change such difference or ratio between the elastic forces of the springs. Thus, according to the devices taught by the Japanese Patent Laid-Opens Nos. 2007-57007 and 2007-194054, an adjustment of the elastic force of the springs is rather complicated, and the freedom of choice is thereby restricted.

On the other hand, according to the connecting device taught by Japanese Patent Laid-Open No. 2003-172487, a valve element of a plug is pushed by an immobile portion (or a structural portion) of a socket, and a valve element of the socket is pushed by an immobile portion (or a structural portion) of the plug. In addition, the valve elements of both socket and the plug are not especially provided with a protruding portion, therefore, a distance between valve seats is short. However, according to the teachings of Japanese Patent Laid-Open No. 2003-172487, leading end portions of the valve elements are protruded from leading ends of the socket and the plug. Especially, a packing member of the valve element of the socket side is protruded to the leading end side of the socket to be pushed by the plug. Therefore, the packing member may be damaged and deteriorated easily, and a durability of the packing member is thereby degraded. In addition, since the leading end portion of the valve element of the socket or the plug is exposed, the valve element may be pushed accidentally by a projection therearound when a container or the like being connected with the plug and the socket is laid carelessly. For the same reason, the valve thus structured may be opened easily even for children by pushing the valve element.

SUMMARY OF THE INVENTION

The present invention has been conceived noting the above-mentioned technical problems, and an object of the present invention is to provide a coupler with a stop valve, which is excellent in durability, which is capable of reducing dripping of a liquid, and in which the valve is not opened accidentally.

In order to achieve the above-explained object, according to the present invention, there is provided a coupler having a stop valve, in which a flow channel formed in a connector of supply side and a flow channel formed in a connector of receiving side are communicated by connecting the connectors of supply and receiving sides with each other to open valves formed in the connectors, comprising: a cylindrical wall, which is formed on at least one of the connectors of supply and receiving side; a fixed shaft, which is arranged along a center axis of the cylindrical wall; a valve seat, which is arranged around a leading end portion of the fixed shaft, and which is tapered to widen a diameter thereof toward a leading end side of the fixed shaft; a cylindrical first valve element, in which an inverse tapered face being congruent with the taper of the valve seat is formed on an inner circumferential face thereof at its leading end portion, and which is fitted onto the fixed shaft in a manner to slide in an axial direction; an elastic member, which pushes the first valve element thereby pressing the inversely tapered face of the first valve element against the valve seat; a flow channel, which is formed between an outer circumferential face of the fixed shaft and the inner circumferential face of the first valve element; an engagement portion, which is formed on the outer circumferential face of the first valve element at an intermediate portion in the axial direction, and which is diametrically larger than the leading end portion of the first valve element; a cylindrical portion, which is formed on the connector other than the connector on which the cylindrical wall is formed, and which is inserted into a clearance between the cylindrical wall and the fixed shaft; and a pushing portion, which is formed at a leading end of the cylindrical portion, and which is pressed against the engagement portion of the first valve element thereby pushing the first valve element in the axial direction against the elastic force of the elastic member.

The cylindrical portion comprises an opening at its leading end to which the first valve element is inserted liquid-tightly, and a flow channel communicated with the opening is formed inside of the cylindrical portion. A second valve element, which is pushed by an elastic member toward the opening of the cylindrical portion is arranged in the cylindrical portion, and a valve seat, to which the second valve element is pressed to close the opening liquid-tightly is formed on the inner face of the cylindrical portion. A leading end portion of the fixed shaft pushes a leading end portion of the second valve element, and a leading end portion of the cylindrical portion is engaged with the engagement portion of the first valve element thereby pushing the first valve element.

Specifically, the aforementioned valve seat is formed of a packing member fitted onto the leading end side of the fixed shaft, and a plate member is formed on the leading end of the fixed shaft to prevent the packing member from falling away from the fixed shaft and to be contacted with the second valve element. On the other hand, the second valve element comprises an another packing member, which is contacted with the valve seat formed on the inner face of the cylindrical portion liquid-tightly, and a flat plate, which is formed at the leading end of the second valve element to prevent said another packing member from falling away from the second valve element and to be contacted with the plate member of the fixed shaft.

In addition, a sealing member is fitted onto a leading end side of the first valve element to seal the opening of the cylindrical portion liquid-tightly before the leading end portion of the fixed shaft pushes the second valve element.

According to the coupler of the present invention, the valve of the connector in which the second valve element is arranged is opened in advance by pushing the second valve element by the fixed shaft thereby isolating the second valve element from the valve seat, and the valve of the connector in which the first valve element is arranged is opened thereafter by pushing the engagement portion of the first valve element by the leading end portion of the cylindrical portion thereby isolating the first valve element from the tapered valve seat.

According to the present invention, the coupler comprises a closing mechanism, which is arranged at a rear end side of the first valve element, and which closes the flow passage under the condition where the inversely tapered inner circumferential face of the first valve element is contacted with the tapered valve seat to close the flow channel.

Specifically, the closing mechanism comprises: a flange portion protruding outwardly from the first valve element; a through hole penetrating the first valve element in a radial direction formed at the leading end side of the first valve element from the flange portion; a ring-shaped packing member, which is arranged on an inner circumferential side of the cylindrical wall, and which is adapted to be contacted with the flange portion liquid-tightly and to seal an outer opening of the through hole of the first valve element, under the condition where the inversely tapered inner circumferential face of the first valve element is contacted with the tapered valve seat liquid-tightly; and a sealing member, which seals the flow channel formed between the inner circumferential face of the first valve element and the outer circumferential face of the fixed shaft, at rear end side of the first valve element from the through hole.

The aforementioned plate member formed on the leading end of the fixed shaft is a disc-shaped covering plate whose diameter is larger than an inner diameter of the first valve element at the leading end side and smaller than an outer diameter of the engagement portion.

Thus, according to the present invention, when the connectors of supply and receiving sides are connected with each other, the cylindrical portion of one of the connector is inserted into the cylindrical wall of the other connector, and the fixed shaft and the first valve element fitted thereon are inserted into the cylindrical portion. In this situation, the leading end portion of the cylindrical portion is gradually contacted with the engagement portion formed on an outer circumferential face of the first valve element with the progress of the insertion, and the first valve element is thereby pushed in its axial direction. Eventually, the first valve element is retracted to be isolated from the valve seat, and the valve in the connector of the supply side is thereby opened. That is, the portion to which an external force is applied to open the valve is the engagement portion formed on the outer circumferential face of the first valve element. Therefore, the elements involved in sealing the outlet of the flow channel liquid-tightly such as the valve seat, the valve element and so on can be prevented from being damaged, and durability of those elements are thereby improved. Moreover, according to the present invention, the valve seat and the inner circumferential face of the leading end of the first valve element contacted therewith are thus tapered. Therefore, the sealing area can be enlarged and the outlet of the flow channel is thereby sealed certainly.

In addition to the above-explained advantage, according to the present invention, both of the connectors of supply side and receiving side are provided individually with a valve. As described, the first valve element is pushed by the leading end portion of the cylindrical portion, and the second valve element is pushed by the leading end portion of the fixed shaft. Therefore, the elastic forces of the elastic members will not influence one another so that the elastic force of each elastic member can be set independently. That is, the order to open the valves of the connectors can be set irrespective of strengths of the elastic members. For this reason, the valves can be opened in the desired order even if the elastic force of the elastic member is set improperly.

As also described, according to the present invention, valves of each connector are opened by mutually pushing the plate members individually holding the packing member for keeping the liquid-tight condition. For this reason, a distance between the packing members can be shortened. Consequently, in case of disconnecting the connectors of the supply and receiving side from each other, an amount of the liquid remaining in the vicinity of the isolated valves can be reduced so that the leakage of the liquid resulting from the disconnection of the connectors can be reduced effectively.

In addition to the above-explained advantage, in case the first valve element is inserted into the cylindrical portion, the valve of the connector of supply side is opened after the clearance between the outer circumferential face of the first valve element and the inner circumferential face of the cylindrical member is sealed by the sealing member. Therefore, leakage and dripping of the liquid can be prevented even in case of connecting the connectors.

As also described, according to the present invention, the valve comprising the first valve element is opened after the valve comprising the second valve element is opened. Therefore, the liquid supplied from the connector of supply side is allowed to enter into the connector of receiving side certainly, by thus arranging the second valve element in the connector of receiving side, and arranging the first valve element in the connector of supply side. For this reason, leakage and dripping of the liquid can be prevented certainly.

Moreover, according to the present invention, the first valve element is adapted to seal the flow channel at least at two points, that is, at the tapered inner face of the leading end and at the flange portion of the rear end side. Therefore, accidental leakage and dripping of the liquid can be prevented certainly.

Furthermore, according to the present invention, the leading end portion of the first valve element is covered by the covering plate, and the engagement portion to be pushed to retract the first valve element in the axial direction thereby opening the valve is arranged on the rear end side of the first valve element, in other words, at a bottom side of the cylindrical wall. Therefore, the first valve element can be prevented certainly from being retracted accidentally or pushed by children.

The above and further objects and novel features of this invention will more fully appear from the following detailed description when the same is read with reference to the accompanying drawings. It is to be expressly understood, however, that the drawings are for purpose of illustration only and are not intended as a definition of the limits of the invention.

DETAILED DESCRIPTION OF THE PREFERRED EMBODIMENT

Figure 1:
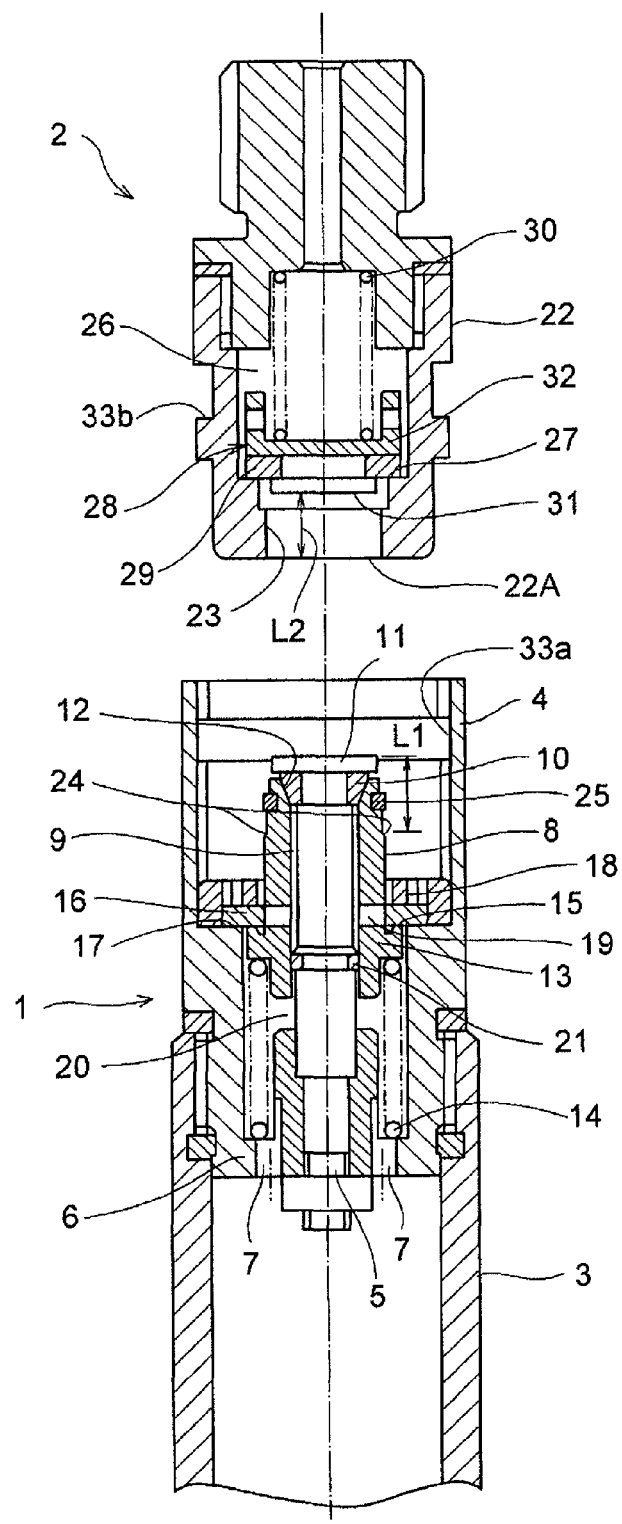
FIG. 1 is a sectional view showing one example of the coupler with a stop valve according to the present invention.

Next, an example of the present invention will be explained with reference to the accompanying drawings. FIG. 1 is a sectional view showing a cross-section of the coupler according to the present invention. As shown in FIG. 1, the coupler of the present invention comprises one pair of connectors 1 and 2. Specifically, the connector 1 is connected with a not shown liquid container, and it can be called a plug. Accordingly, the connector 1 corresponds to the connector of supply side of the present invention. Meanwhile, the connector 2 is connected with a not shown device such as a fuel cell, and it can be called a socket. Accordingly, the connector 2 corresponds to the connector of receiving side of the present invention.

Here will be explained a structure of the connector 1 (as will be called a plug 1). As shown in FIG. 1, a cylindrical wall 4 is attached to a leading end of a nozzle 3. The cylindrical wall functions not only as a connection member but also as an outer cover of an after-mentioned valve mechanism. A fixed shaft 5 (as will be called a valve shaft 5) is arranged along a center axis of the cylindrical wall 4, and held by a retention wall 6. In order to communicate an inner space of the cylindrical wall 4 and an inner space of the nozzle 3, a plurality of through holes 7 is formed on the retention wall 6.

A slide valve 8 corresponding to the first valve element of the present invention is fitted onto the valve shaft 5 at a leading end side of the fixed valve 5 in a slidable manner along the axial direction. Specifically, the slide valve 8 is a cylindrical or hollow shaft member, and an inner diameter thereof is larger than an outer diameter of the valve shaft 5. Therefore, a flow channel 9 is formed between an inner circumferential face of the slide valve 8 and an outer circumferential face of the valve shaft 5.

A valve mechanism for gating the flow channel 9 is formed at leading end portions of the slide valve 8 and the valve shaft 5. Specifically, a packing 10 is fitted onto the leading end portion of the valve shaft 5, and an outer circumferential face of the packing 10 is tapered to reduce an outer diameter thereof toward the slide valve 8 side (i.e., downwardly in FIG. 1). The packing 10 is stopped by a plate member 11 attached to the leading end portion of the valve shaft 5. That is, the packing 10 is situated between the plate member 11 and a corner of the valve shaft 5. On the other hand, a tapered face 12 is formed on an inner circumferential face of the slide valve 8 at its leading end portion. The tapered face 12 is tapered inversely to be congruent with the tapered outer circumferential face of the packing 10. Therefore, an opening of the leading end side of the slide valve 8, that is, the flow channel 9 is closed by contacting the tapered face 12 with the outer circumferential face of the packing 10 liquid-tightly, in other words, pushing the valve element tightly onto the valve seat.

Meanwhile, a flange portion 13 projecting radially-outwardly is formed integrally with the slide valve 8 at a rear end side of the slide valve 8. In order to push the slide valve 8 toward the leading end side thereof (i.e., upwardly in FIG. 1), a coil spring 14 corresponding the elastic member of the present invention is arranged between the flange portion 13 and the retention wall 6.

In addition the flange portion also functions as a part of a second valve mechanism of the plug 1. Specifically, a projecting ring 15 is formed on an outer circumferential edge of an upper face of the flange portion 13 (i.e., on a side opposite to a side on which the coil spring 14 is arranged). Meanwhile, a ring-shaped packing 16 is fixed in the cylindrical wall 4 to serve as a valve seat. The projecting ring 15 is contacted liquid-tightly with the packing member 16, and the outer circumferential face of the slide valve 8 is contacted with an inner circumferential face of the packing 16 in a slidable manner.

Here will be explained an installation structure of the packing 16 in more detail. An inner diameter of the cylindrical wall 4 is reduced below (i.e., lower side in FIG. 1) a level at which the leading end portion of the projecting ring 15 formed on the flange portion 13 of the slide valve 8 is stopped in case the slide valve 8 is contacted with the packing 10 at its leading end. In other words, the inner diameter of the cylindrical wall 4 is enlarged above the aforementioned level (i.e., upper side in FIG. 1). That is, the portion of the inner circumferential face of the cylindrical wall 4 where the inner diameter of the cylindrical wall is thus changed is a step 17. The packing 16 is inserted into an inner space of the cylindrical wall 4 where the inner diameter thereof is enlarged to be contacted with the step 17. In addition, a ring shaped packing plate 18 is fixedly fitted into the inner space of the cylindrical wall 4 where the inner diameter thereof is enlarged thereby fixing the packing 16 between the step 17 and the packing plate 18.

A plurality of through holes 19 are formed to penetrate radially through the slide valve 8 at the leading end side of slide valve 8 from the flange portion 13. Specifically, the through holes 19 are formed on the slide valve 8 at a portion to be closed by the ring-shaped packing 16 in case the slide valve 8 is pushed toward the packing 10 and contacted therewith at its leading end.

In the inner space of the cylindrical wall 4 where the inner diameter thereof is reduced, a space holding the coil spring 14 served as a flow channel 20. In order to disconnect the flow channel 20 from the flow channel 9 formed inside of the slide valve 8, a seal ring 21 is arranged between the inner circumferential face of the slide valve 8 and the outer circumferential face of the valve shaft 5. Specifically, the seal ring 21 as an O-ring is fitted onto the valve shaft 5.

Thus, an inner space of the container to which the nozzle 3 is attached is disconnected from an outer space of the leading end side of the plug 1 by the valve mechanism composed mainly of the inner circumferential face of the leading end of the slide valve 8 and the tapered packing 10, and by the valve mechanism corresponding to the closing mechanism of the present invention composed mainly of the flange portion 13 and the ring-shaped packing 16. To the contrary, the inner space of the container to which the nozzle 3 is attached is communicated with the outer space of the leading end side of the plug 1 by opening those valve mechanisms.

Next, a structure for retracting the slide valve 8 against the elastic force of the coil spring 14, that is, a structure for opening the valve comprising the slide valve 8 will be explained hereinafter. According to the example shown in FIG. 1, the slide valve 8 is pushed by the connector of receiving side 2 (as will be called a socket 2). Specifically, the socket 2 comprises a cylindrical portion 22 to be inserted into the above-explained cylindrical wall 4. The cylindrical portion 22 comprises an opening 23 at its leading end side (i.e., lower side in FIG. 1), and the leading end portions of the valve shaft 5 and the slide valve 8 fitted thereon are to be inserted therein when the cylindrical portion 22 is inserted into the cylindrical wall 4.

A tapered engagement portion 24 is formed on the outer circumferential face of the slide valve 8 at an axially intermediate portion, and an outer diameter of the engagement portion 24 is larger than an inner diameter of the cylindrical portion 22. In addition, an O-ring 25 is fitted onto the slide valve 8 at a portion of the leading end side from the engagement portion 24. The O-ring 25 is contacted with an inner circumferential face of the opening 23 to keep liquid-tight condition in case the slide valve 8 is inserted into the opening 23. Specifically, in case the cylindrical portion 22 is inserted into the cylindrical wall 4, the leading end portions of the valve shaft 5 and the slide valve 8 are inserted into the opening 23, and the O-ring 25 is interposed between the outer circumferential face of the slide valve 8 and the inner circumferential face of the opening 23 to seal a clearance therebetween liquid-tightly. Thereafter, a leading end portion 22A of the opening 23 is gradually contacted with the engagement portion 24 formed on the outer circumferential face of the slide valve 8. As a result, the slide valve 8 is pushed backwardly in its axial direction by the cylindrical portion 22. Accordingly, the leading end portion 22A corresponds to the pushing portion of the present invention.

The cylindrical portion 22 also serves as an outer cover of the valve mechanism of the socket 2. Specifically, a hollow portion in the cylindrical portion 22 where an inner diameter thereof is larger than that of the opening 23 serves as a flow channel 26, and a step formed on the inner circumferential face of the cylindrical portion 22 at a border between the opening 23 and the flow channel 26 serves as a valve seat 27. In order to close the flow channel 26, a valve element 28 is arranged to be contacted with the valve seat 27.

Specifically, the valve element 28 is a disc-shaped element and an outer diameter thereof is substantially identical to an inner diameter of the flow channel 26. As shown in FIG. 1, a cross section of the valve element 28 may be depressed, and a seal packing 29 is attached to a lower face (in FIG. 1) of the valve element 28. In order to push the valve element 28 onto the valve seat 27, a coil spring 30 is arranged above an upper face (in FIG. 1) of the valve element 28.

Here will be explained an installation structure of the seal packing 29 in more detail. A lower end portion of the valve element 28 is a flat plate 31 whose outer diameter is larger than an inner diameter of the ring-shaped seal packing 29, and the seal packing 29 is held between the flat plate 31 and a main body 32 of the valve element 28.

An outer diameter of the flat plate 31 is substantially identical to that of the plate member 11 attached to the leading end of the valve shaft 5. Accordingly, the flat plate 31 is pushed by the plate member 11 of the valve shaft 5, and the valve element 28 is thereby retracted in its axial direction to open the valve in the socket 2.

The outer diameter of the plate member 11 is larger than the inner diameter of the leading end portion of the slide valve 8, and smaller than the inner diameter of the opening 23. In addition, the plate member 11 is retracted from a level of the leading end of the cylindrical wall 4. That is, the leading end portion of the slide valve 8 as a movable member is protected by the plate member 11 from external circumstances, and the plate member 11 therefore corresponds to the covering plate of the present invention. For this reason, the slide valve 8 is prevented from being pushed easily in its axial direction by a pin or a shaft inserted into the cylindrical wall 4 accidentally or by a child. In addition, since the engagement portion 24 is tapered as explained above, the slide valve 8 can be prevented from being pushed in its axial direction more certainly. Thus, according to the present invention, the slide valve 8 will not open the valves in the plug 1 under the situation where the plug 1 is not inserted into the socket 2, and in this situation, leakage of the liquid held in the container is thereby prevented.

As shown in FIG. 1, a latch portion 33a is formed on the inner circumferential face of the cylindrical wall 4, and a latch portion 33b is formed on the outer circumferential face of the cylindrical portion 22. Therefore, the plug 1 and the socket 2 are integrated with each other by inserting the cylindrical portion 22 into the cylindrical wall 4, and engaged by engaging the latch portion 33a with the latch portion 33b.

According to the coupler shown in FIG. 1, the valve element 28 is retracted in advance to open the valve in the socket 2, and the slide valve 8 is then retracted to open the valves in the plug 1, when inserting the plug 1 into the socket 2. Specifically, a length (or clearance) L1 of the plug 1 between the leading end face of the plate member 11 attached to the valve shaft 5 and the engagement portion 24 formed on the outer circumferential face of the slide valve 8 is longer than a length (or clearance) L2 of the socket 2 between the leading end portion of the cylindrical portion 22 (or the leading end portion 22A of the opening 23) and the leading end face of the flat plate 31 of the valve element 28. Accordingly, the valve element 28 of the socket 2 is pushed first by the valve shaft 5 to be retracted in the axial direction, and then, the slide valve 8 is pushed by the leading end portion 22A at the engagement portion 24 to open the valves in the plug 1. As described, the O-ring 25 seals the clearance between the outer circumferential face of the slide valve 8 and the inner circumferential face of the opening 23 liquid-tightly, under the situation where the valve element 28 is pushed to open the valve in the socket 2 but the slide valve 8 has not yet been pushed.

Next, here will be explained an action of the coupler shown in FIG. 1. As descried, the plug 1 and the socket 2 shown in FIG. 1 have not yet been connected with each other. In this situation, the leading end of the cylindrical wall 4 of the plug 1 is still opened. However, the leading end portion of the slide valve 8 as a movable member is covered by the plate member 11 attached to the valve shaft 5. Therefore, the slide valve 8 will not be pushed easily even if the plug 1 or the container attached to the plug 1 is handled carelessly, or even if a pin or shaft is inserted into the cylindrical wall 4 by a child. For this reason, the liquid held in the container will not leak accidentally from the plug 1. Moreover, as also described, the flow channel 9 is sealed liquid-tightly by contacting the tapered face 12 formed on the inner circumferential face of the leading end of the slide valve 8 with the tapered packing 10, and the flow channel 20 is sealed liquid-tightly by contacting the flange portion 13 with the ring-shaped packing 16. That is, the liquid held in the container is closed by the two sets of valve mechanisms. Therefore, leakage of the liquid held in the container can be prevented certainly.

Figure 2:
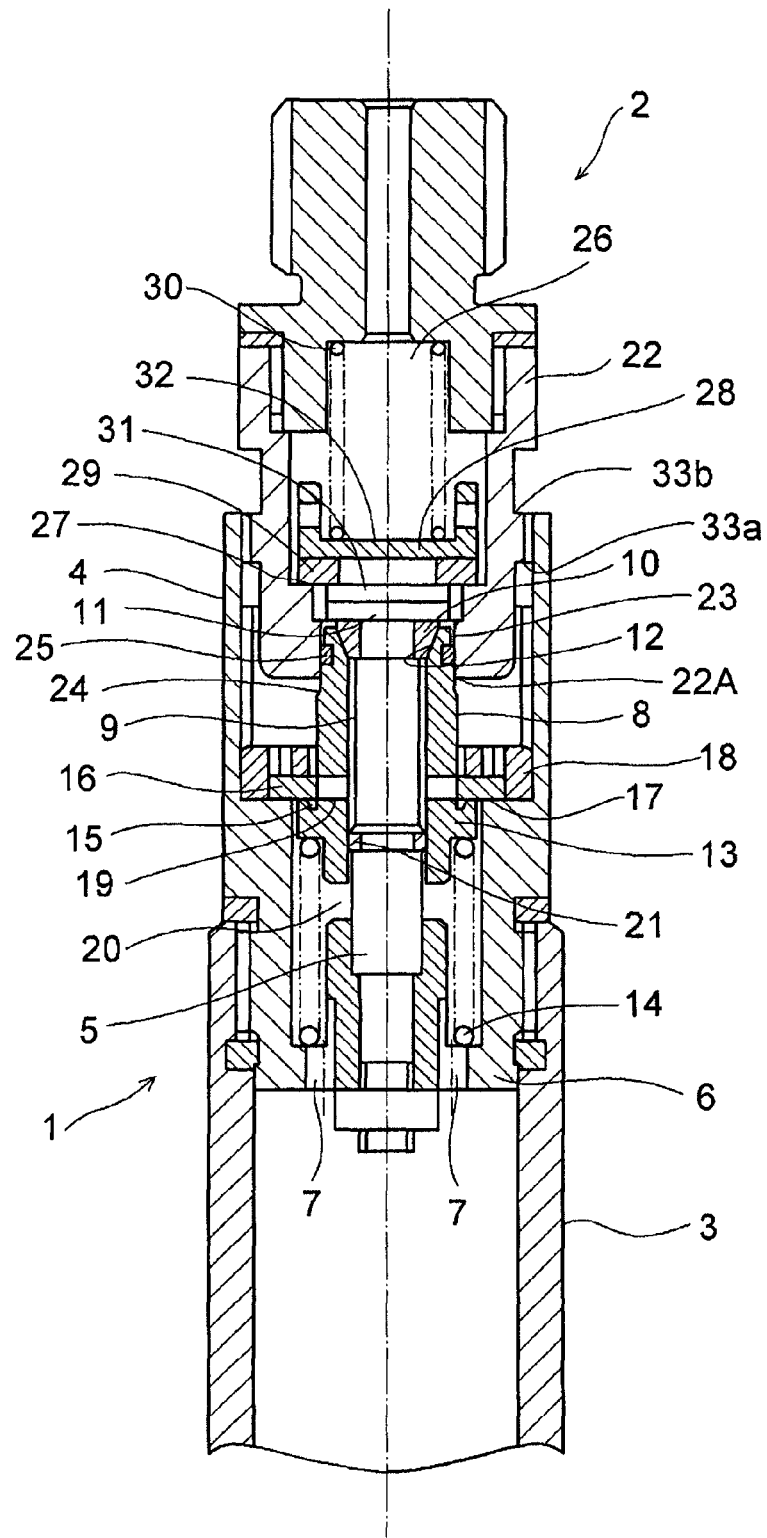
FIG. 2 is a sectional view showing an initial phase of inserting the plug into the socket.

FIG. 2 is a sectional view showing an initial phase of inserting the plug 1 into the socket 2. Specifically, in case of inserting the plug 1 into the socket 2, the cylindrical portion 22 is inserted into a clearance between the cylindrical wall 4 and the slide valve 8, and the valve shaft 5 and the slide valve 8 fitted thereon are inserted into the opening 23 of the cylindrical portion 22. In this situation, the plate member 11 of the valve shaft 5 and the flat plate 31 of the valve element 28 are gradually contacted with each other, and the O-ring 25 fitted onto the slide valve 8 is contacted with the inner circumferential face of the opening 23 to close the opening 23 liquid-tightly.

A hollow space formed in this situation between the packing 10 and the seal packing 29 is a space where the liquid may remain after the valves are closed again in case of withdrawing the plug 1 from the socket 2. However, according to the example shown in FIG. 1, the packing 10 is held behind the plate member 11 and the seal packing 29 is held behind the flat plate 31. That is, the packing 10 and the seal packing 29 are situated close together so that a volume of such hollow space is decreased. Therefore, the liquids remaining in both of the plug 1 side and the socket 2 side when disconnecting the plug 1 from the socket 2 can be reduced, and the leakage of the liquid is thereby prevented or avoided. In addition, since the valve element 28 closes the valve in the socket 2 after the valves in the plug 1 are closed by the slide valve 8, the leakage of the liquid can be prevented more certainly.

Figure 3:
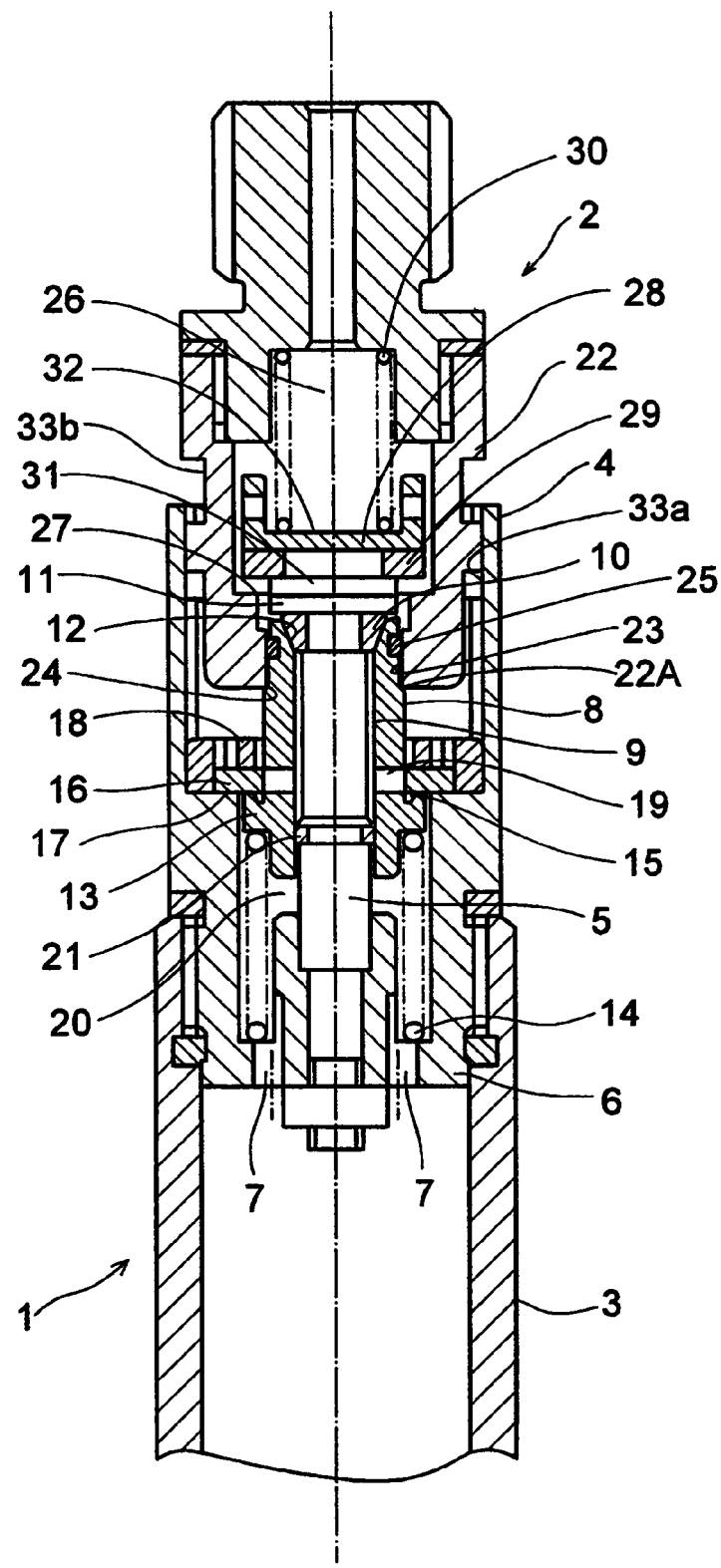
FIG. 3 is a sectional view showing a phase in which the plug is further inserted into the socket.

With the progress of insertion of the plug 1 into the socket 2, the valve element 28 of the socket 2 is retracted eventually in its axial direction by the valve shaft 5 of the plug 1 while compressing the coil spring 30 as shown in FIG. 3.

That is, the valve element 28 is isolated from the valve seat 27 and the valve in the socket 2 is thereby opened. A load to open the valve in the socket 2 is applied to the flat plate 31 of the valve element 28 by the plate member 11 of the valve shaft 5 being contacted therewith, however, the load will not be applied to the packing 29 situated between the main body 32 and the flat plate 31. Therefore, the packing 29 is prevented from being damaged so that the lifetime of the packing 29 can be elongated. Here, the load to open the valve in the socket 2 is not established by the coil spring 14 of the plug 1 but derived from the insertion of the plug 1 into the socket 2. In this situation, the leading end portion 22A of the cylindrical portion 22 of the socket 2 has not yet reached the engaging portion 24 of the slide valve 8 or merely contacted with the engaging portion 24. In other words, the slide valve 8 has not yet been pushed by the leading end portion 22A and therefore the valves in the plug 1 are still closed.

Figure 4:
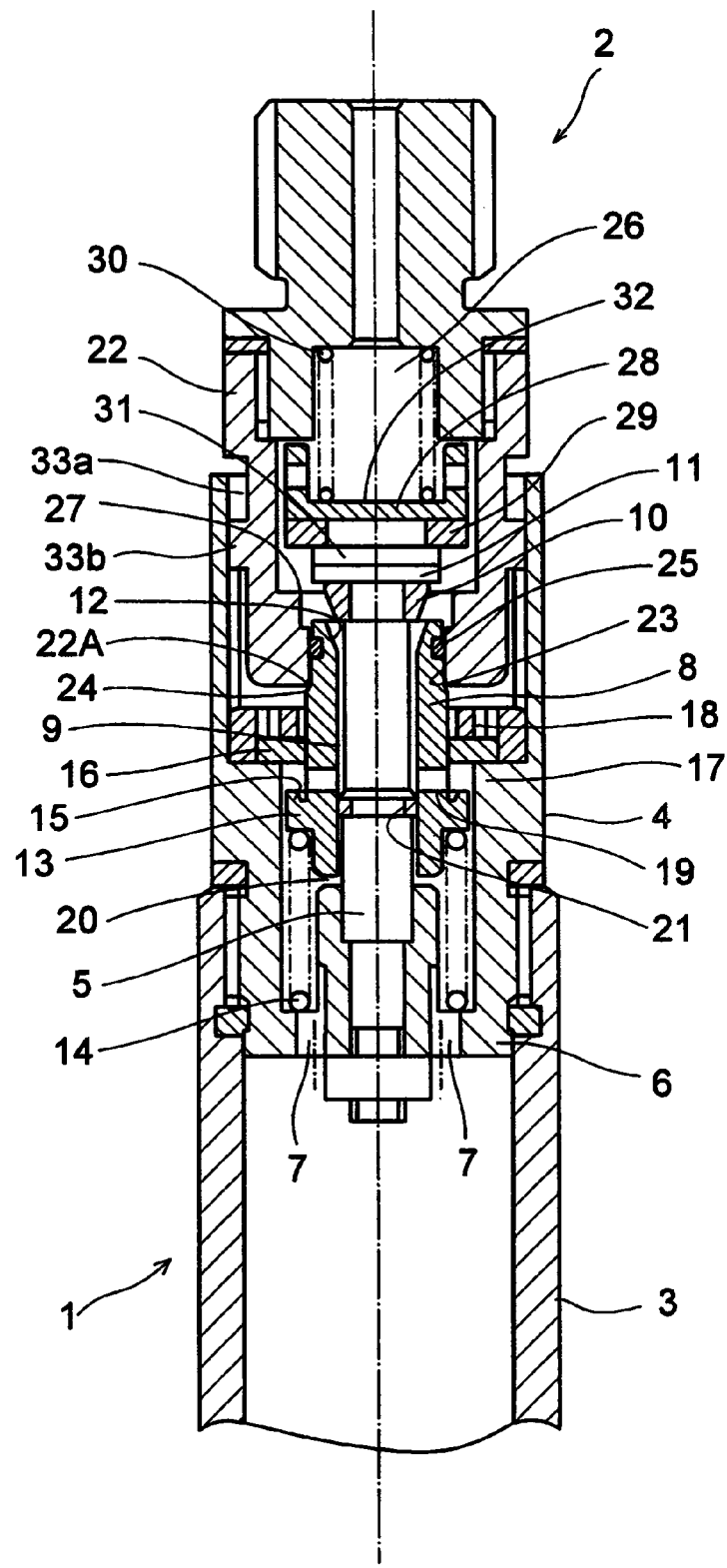
FIG. 4 is a sectional view showing a phase in which the plug is completely inserted into the socket.

FIG. 4 is a sectional view showing a phase in which the plug 1 is completely inserted into the socket 2. Specifically, as shown in FIG. 4, the plug 1 is further inserted into the socket 2, and the latch portion 33a of the cylindrical wall 4 is engaged with the latch portion 33b of the cylindrical portion 22. In this situation, the slide valve 8 is further inserted into the opening 2 of the cylindrical portion 22, and the leading end portion 22A of the cylindrical portion 22 is pushed onto the engagement portion 24 on the outer circumferential face of the slide valve 8. As a result, the slide valve 8 is retracted in its axial direction. That is, the leading end portion of the slide valve 8 is isolated from the tapered packing 10 to open the valve in the plug 1. Thus, the load to push the slide valve 8 is not applied to the packing 10 but to the engagement portion 24 also in this case. Therefore, the packing 10 is also prevented from being damaged so that the lifetime of the packing 10 can be elongated. In addition, the load to push the slide valve 8 is applied thereto by a structural member such as the cylindrical portion 22, that is, the load to push the slide valve 8 does not rely on an elastic force of the coil spring 30 of the socket 2.

When the slide valve 8 is thus retracted in its axial direction (i.e., downwardly in FIGS. 1 to 4), the tapered face 12 of its leading end is isolated from the packing 10, and the flange portion 13 is isolated from the packing 16 thereby opening the through hole 19. Consequently, the flow channel 9 is communicated with the flow channel 20 formed in a rear end side of the cylindrical wall 4 and the flow channel 26 formed in the socket 2. As a result, the connection of the coupler, that is, the insertion of the plug 1 into the socket 2 is completed, and the plug 1 is kept connected with the socket 2 by engaging the latch portions 33a with the latch portion 33b. When the container is thus connected with the main body of the device, the liquid such as ethanol is supplied from the container to the device. The liquid can be supplied to the device not only by pressurizing the liquid in the container side but also by sucking the liquid by the device side.

Thus, according to the coupler of the present invention, the valve element 28 is retracted first to open the valve in the socket 2, and then, the slide valve 8 is retracted to open the valves in the plug 1. Therefore, the liquid fed from the container to which the plug 1 is attached can be supplied to the socket 2 side without hindrance, and a leakage of the liquid can be prevented certainly. In addition, according to the example thus has been explained, the order to open the valves of the plug 1 and the socket 2 is not governed by the elastic forces of the coil springs 14 and 30 but governed by structures or dimensions of the plug 1 and the socket 2. Therefore, the order or timing to open the valves of the plug 1 and the socket 2 will not be changed accidentally or unwillingly.

Figure 5:
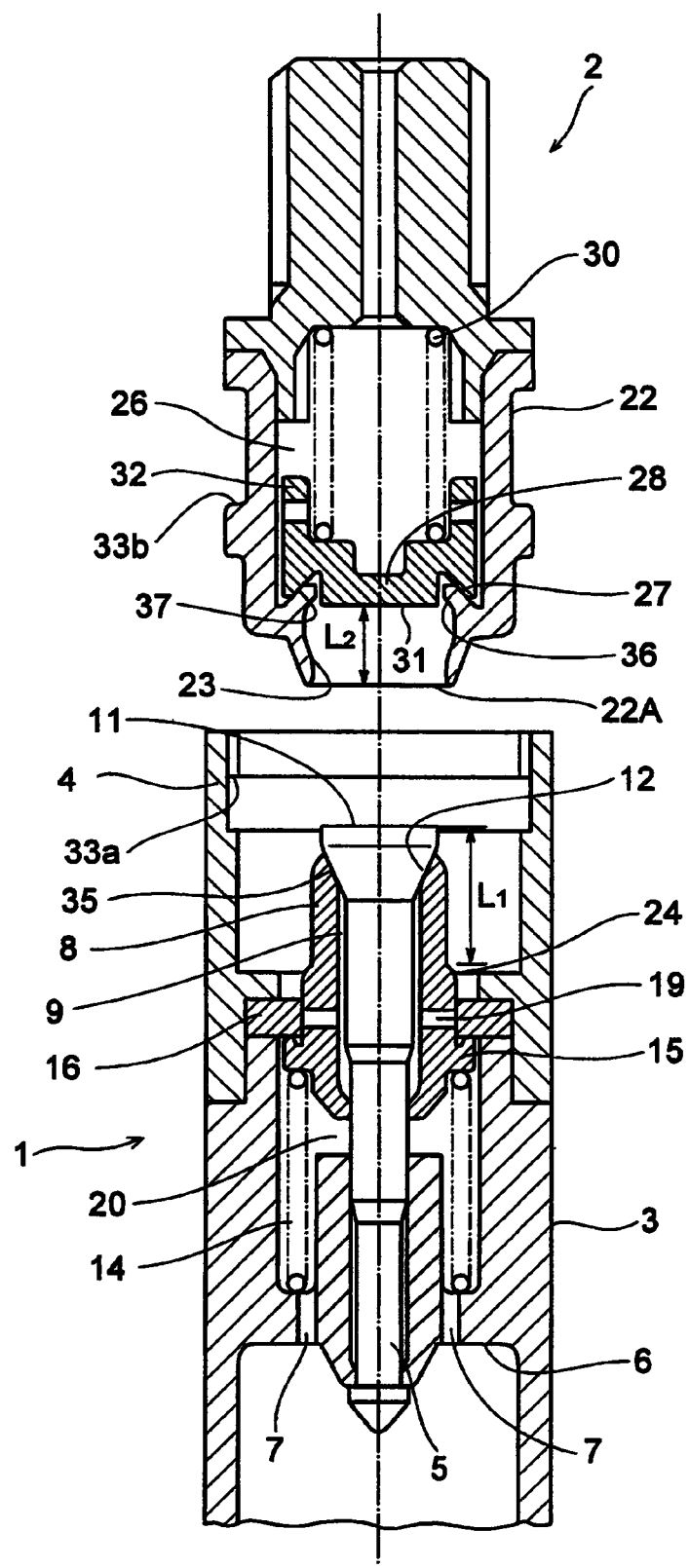
FIG. 5 is a sectional view showing another example of the coupler with a stop valve according to the present invention.

Next, here will be explained an another example of the present invention with reference to FIG. 5. According to the example thus has been explained, the packing 10 fitted onto the leading end portion of the valve shaft 5 serves as the valve seat, and the seal packing 29 fitted onto the valve element 28 is contacted with the valve seat 27 to maintain the liquid-tight condition in the socket 2. Alternatively, according to the present invention, the plug 1 and the socket 2 can also be sealed liquid-tightly without using the packing 10 and the seal packing 29. Specifically, as shown in FIG. 5, the leading end portion of the valve shaft 5 is tapered to serve as a valve seat 35 instead of the packing 10. That is, the valve seat 35 is made of the same material as the valve shaft 5, and a hardness of the valve seat 35 is harder than that of the aforementioned packing 10. In order to close the flow channel 9, the tapered face 12 of the slide valve 8 is contacted with the tapered valve seat 35.

On the other hand, the valve seat 27 is tapered to widen the diameter thereof gradually toward the leading end side (i.e., downwardly in FIG. 5). Specifically, the cylindrical portion 22 comprises a cylinder 36 extending from the leading end side thereof toward the valve element 28, and an outer circumferential face of the cylinder 36 serves as the aforementioned tapered valve seat 27. Meanwhile, an annular groove is formed on an outer circumference of the flat plate 31 of the valve element 28, and an outer circumferential wall of the annular groove is a tapered face 37 congruent with the taper of the valve seat 27. According to the example shown in FIG. 5, the flow channel in the socket 2 is closed liquid-tightly by contacting the tapered face 37 with the tapered valve seat 27.

The remaining structures of the example shown in FIG. 5 is similar to those of the example shown in FIG. 1, therefore, further explanation about the structures in common with the example shown in FIG. 1 is omitted by allotting common reference numerals to FIG. 5. Here, according to the example shown in FIG. 5, the retention wall 6 is formed on the nozzle 3, and the valve shaft 5 is therefore held by the nozzle 3. In addition, the packing 16 to which the projecting ring 15 is contacted is held in a clearance between a leading end portion of the nozzle 3 and a flange portion protruding inwardly from an inner circumferential face of the cylindrical wall 4.

The advantages of the coupler shown in FIG. 1 can also be achieved by the coupler shown in FIG. 5. In addition, according to the coupler shown in FIG. 5, a number of the packings used in the valve mechanisms can be reduced. Therefore, the structure of the coupler can be simplified so that the cost of the coupler can be reduced.

The present invention should not be limited to the examples thus far explained, and the structure of the aforementioned couplers may be omitted or altered partially. For example, the liquid held in the container may also be liquid other than ethanol, and the device to which the coupler of the present invention is connected may also be a device other than the fuel cell. In addition, the coil springs may be replaced by other kind of elastic members.

What is claimed is:

1. A coupler having a stop valve, in which a flow channel in a first connector and a flow channel in a second connector communicate by connecting the first and second connectors with each other to open valves formed in the connectors, the coupler having a stop valve comprising:
   a cylindrical wall formed on the first connector;
   a fixed shaft arranged along a center axis of the cylindrical wall;
   a first valve seat arranged around a leading end portion of the fixed shaft, a diameter of the first valve seat being tapered such that the diameter widens toward a leading end side of the fixed shaft;
   a cylindrical first valve element including an inversely tapered face, which is congruent with the tapered diameter of the first valve seat, formed on an inner circumferential face of the first valve element at a leading end portion thereof, the first valve element being fitted onto the fixed shaft in a manner to slide in an axial direction;
   a first elastic member that pushes the first valve element, thereby pressing the inversely tapered face of the first valve element against the first valve seat;
   the flow channel of the first connector, which is formed between an outer circumferential face of the fixed shaft and the inner circumferential face of the first valve element;
   an engagement portion formed on an outer circumferential face of the first valve element at an intermediate portion in the axial direction, an outer diameter of the engagement portion being tapered such that the outer diameter is narrowed toward a leading end side of the first valve element and is diametrically larger than the leading end portion of the first valve element;
   a covering plate having a diameter that is larger than an inner diameter at the leading end side of the first valve element and that is smaller than the outer diameter of the engagement portion provided on the leading end of the fixed shaft;
   a cylindrical portion formed on the second connector, the cylindrical portion being inserted into a clearance between the cylindrical wall and the fixed shaft;
   a pushing portion formed at a leading end of the cylindrical portion, the pushing portion being pressed against the engagement portion of the first valve element thereby pushing the first valve element in the axial direction against an elastic force of the first elastic member; and
   a closing mechanism, which is arranged at a rear end side of the first valve element, and which closes a flow passage when the inversely tapered face of the first valve element is in contact with the tapered valve seat to close the flow channel, the closing mechanism including
      a flange portion protruding outwardly from the first valve element,
      a through hole penetrating the first valve element in a radial direction formed at the leading end side of the first valve element from the flange portion,
      a ring-shaped packing member, which is arranged on an inner circumferential side of the cylindrical wall, and which is adapted to be contacted with the flange portion liquid-tightly and to seal an outer opening of the through hole of the first valve element, under a condition where the inversely tapered face of the first valve element is contacted with the first valve seat liquid-tightly, and a sealing member, which seals the flow channel of the first connector formed between the inner circumferential face of the first valve element and the outer circumferential face of the fixed shaft, the sealing member being disposed at the rear end side of the first valve element from the through hole.

2. The coupler having a stop valve according to claim 1, wherein the cylindrical portion comprises an opening at a leading end thereof to which the first valve element is inserted liquid-tightly, and the flow channel of the second connector communicated with the opening is formed inside of the cylindrical portion, wherein a second valve element, which is pushed by a second elastic member toward the opening of the cylindrical portion is arranged in the cylindrical portion, and a second valve seat, to which the second valve element is pressed to close the opening liquid-tightly is formed on an inner face of the cylindrical portion, and wherein the leading end portion of the fixed shaft pushes a leading end portion of the second valve element, and a leading end portion of the cylindrical portion is engaged with the engagement portion of the first valve element, thereby pushing the first valve element.

3. The coupler having a stop valve according to claim 2, wherein the first valve seat is formed of a packing member fitted onto the leading end side of the fixed shaft, wherein the covering plate on the leading end of the fixed shaft prevents the packing member from falling away from the fixed shaft and from contacting the second valve element, and wherein the second valve element comprises
a second packing member in contact with the second valve seat formed on the inner face of the cylindrical portion liquid-tightly, and
a flat plate formed at the leading end of the second valve element to prevent the second packing member from falling away from the second valve element and from contacting the covering plate of the fixed shaft.

4. The coupler having a stop valve according to claim 2, wherein a sealing member is fitted onto the leading end side of the first valve element to seal the opening of the cylindrical portion liquid-tightly before the leading end portion of the fixed shaft pushes the second valve element.

5. The coupler having a stop valve according to claim 2, wherein the valve of the second connector is opened in advance by pushing the second valve element by the fixed shaft, thereby isolating the second valve element from the second valve seat, and wherein the valve of the first connector is opened thereafter by pushing the engagement portion of the first valve element by the leading end portion of the cylindrical portion, thereby isolating the first valve element from the first valve seat.

6. A coupler having a stop valve, in which a flow channel in a first connector and a flow channel in a second connector communicate by connecting the first and second connectors with each other to open valves formed in the connectors, the coupler having a stop valve comprising:

a cylindrical wall formed on the first connector;
a fixed shaft arranged along a center axis of the cylindrical wall;
a first valve seat arranged around a leading end portion of the fixed shaft, a diameter of the first valve seat being tapered such that the diameter widens toward a leading end side of the fixed shaft;
a cylindrical first valve element including an inversely tapered face, which is congruent with the tapered diameter of the first valve seat, formed on an inner circumferential face of the first valve element at a leading end portion thereof, the first valve element being fitted onto the fixed shaft in a manner to slide in an axial direction;
a first elastic member that pushes the first valve element, thereby pressing the inversely tapered face of the first valve element against the first valve seat;
the flow channel of the first connector, which is formed between an outer circumferential face of the fixed shaft and the inner circumferential face of the first valve element;
an engagement portion formed on an outer circumferential face of the first valve element at an intermediate portion in the axial direction, the engagement portion being tapered to the leading end portion of the first valve element and diametrically larger than the leading end portion of the first valve element;
a cylindrical portion formed on the second connector the cylindrical portion being inserted into a clearance between the cylindrical wall and the fixed shaft;
a pushing portion formed at a leading end of the cylindrical portion, the pushing portion being pressed against the engagement portion of the first valve element thereby pushing the first valve element in the axial direction against an elastic force of the first elastic member;
a closing mechanism, which is arranged at a rear end side of the first valve element, and which closes a flow passage when the inversely tapered face of the first valve element is in contact with the tapered valve seat to close the flow channel, the closing mechanism including
a flange portion protruding outwardly from the first valve element;
a through hole penetrating the first valve element in a radial direction formed at the leading end side of the first valve element from the flange portion;
a ring-shaped packing member, which is arranged on an inner circumferential side of the cylindrical wall, and which is adapted to be contacted with the flange portion liquid-tightly and to seal an outer opening of the through hole of the first valve element, under a condition where the inversely tapered face of the first valve element is contacted with the first valve seat liquid-tightly; and
a sealing member, which seals the flow channel of the first connector formed between the inner circumferential face of the first valve element and the outer circumferential face of the fixed shaft, the sealing member being disposed at the rear end side of the first valve element from the through hole.

7. The coupler having a stop valve according to claim 6, further comprising a covering plate having a diameter that is larger than an inner diameter at the leading end side of the first valve element and that is smaller than an outer diameter of the engagement portion provided on the leading end of the fixed shaft.

8. The coupler having a stop valve according to claim 6, wherein the cylindrical portion comprises an opening at a leading end thereof to which the first valve element is inserted liquid-tightly, and the flow channel of the second connector communicated with the opening is formed inside of the cylindrical portion, wherein a second valve element, which is pushed by a second elastic member toward the opening of the cylindrical portion is arranged in the cylindrical portion, and a second valve seat, to which the second valve element is pressed to close the opening liquid-tightly is formed on an inner face of the cylindrical portion, and wherein the leading end portion of the fixed shaft pushes a leading end portion of the second valve element, and a leading end portion of the cylindrical portion is engaged with the engagement portion of the first valve element, thereby pushing the first valve element.

9. The coupler having a stop valve according to claim 8, wherein the first valve seat is formed of a packing member fitted onto the leading end side of the fixed shaft, wherein the covering plate on the leading end of the fixed shaft prevents the packing member from falling away from the fixed shaft and from contacting the second valve element, and wherein the second valve element comprises a second packing member in contact with the second valve seat formed on the inner face of the cylindrical portion liquid-tightly, and a flat plate formed at the leading end of the second valve element to prevent the second packing member from falling away from the second valve element and from contacting the covering plate of the fixed shaft.

10. The coupler having a stop valve according to claim 8, wherein a sealing member is fitted onto the leading end side of the first valve element to seal the opening of the cylindrical portion liquid-tightly before the leading end portion of the fixed shaft pushes the second valve element.

11. The coupler having a stop valve according to claim 8, wherein the valve of the second connector is opened in advance by pushing the second valve element by the fixed shaft, thereby isolating the second valve element from the second valve seat, and wherein the valve of the first connector is opened thereafter by pushing the engagement portion of the first valve element by the leading end portion of the cylindrical portion, thereby isolating the first valve element from the first valve seat.

* * * * *